United States Patent
Banham et al.

(10) Patent No.: US 11,258,072 B2
(45) Date of Patent: Feb. 22, 2022

(54) CATALYST LAYER FOR A FUEL CELL AND METHOD FOR THE PRODUCTION THEREOF

(71) Applicant: Volkswagen AG, Wolfsburg (DE)

(72) Inventors: Dustin Banham, Burnaby (CA); Brooks Friess, Burnaby (CA); Siyu Ye, Burnaby (CA)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/126,527

(22) PCT Filed: Dec. 18, 2014

(86) PCT No.: PCT/EP2014/078532
§ 371 (c)(1),
(2) Date: Sep. 15, 2016

(87) PCT Pub. No.: WO2015/139791
PCT Pub. Date: Sep. 24, 2015

(65) Prior Publication Data
US 2017/0084927 A1 Mar. 23, 2017

(30) Foreign Application Priority Data
Mar. 18, 2014 (DE) .......................... 102014205033.2

(51) Int. Cl.
*H01M 4/86* (2006.01)
*H01M 4/88* (2006.01)
(Continued)

(52) U.S. Cl.
CPC ....... *H01M 4/8663* (2013.01); *H01M 4/8605* (2013.01); *H01M 4/881* (2013.01);
(Continued)

(58) Field of Classification Search
CPC ............ H01M 4/8663; H01M 4/8605; H01M 4/8807; H01M 4/881; H01M 4/8828; H01M 8/1004; H01M 2008/1095; Y02P 70/56
See application file for complete search history.

(56) References Cited

U.S. PATENT DOCUMENTS

| 5,998,057 A | 12/1999 | Koschany et al. |
| 8,580,445 B2 | 11/2013 | Greszler et al. |
| (Continued) | | |

FOREIGN PATENT DOCUMENTS

| CN | 1947289 A | 4/2007 |
| CN | 101138116 | 3/2008 |
| (Continued) | | |

OTHER PUBLICATIONS

Joo, Ji Bong, et al. "Preparation of mesoporous carbon templated by silica particles for use as a catalyst support in polymer electrolyte membrane fuel cells." Catalysis today 111.3-4 (2006): 171-175. (Year: 2006).*

(Continued)

*Primary Examiner* — Brian R Ohara
(74) *Attorney, Agent, or Firm* — Davidson, Davidson & Kappel, LLC

(57) ABSTRACT

A catalyst layer (20) for a fuel cell and to a method suitable for producing the catalyst layer (20). The catalyst layer (20) includes a catalyst material (22) containing a catalytic material (24) and optionally porous carrier material (23) on which the catalytic material (24) is supported. The catalyst layer also includes mesoporous particles (21) made from hydrophobic material.

18 Claims, 2 Drawing Sheets

(51) Int. Cl.
*H01M 8/1004* (2016.01)
*H01M 8/1018* (2016.01)
*H01M 8/10* (2016.01)

(52) U.S. Cl.
CPC ....... *H01M 4/8807* (2013.01); *H01M 4/8828* (2013.01); *H01M 8/1004* (2013.01); *H01M 2008/1095* (2013.01); *Y02P 70/50* (2015.11)

(56) References Cited

U.S. PATENT DOCUMENTS

| | | | |
|---|---|---|---|
| 8,784,768 | B2 | 7/2014 | Cai et al. |
| 8,999,606 | B2 | 4/2015 | Iijima et al. |
| 9,379,389 | B2 | 6/2016 | Jung et al. |
| 9,735,433 | B2 | 8/2017 | Tadokoro et al. |
| 9,755,247 | B2 | 9/2017 | Schueth et al. |
| 10,087,330 | B2 | 10/2018 | Green et al. |
| 2003/0118890 | A1 | 6/2003 | Wittpahl et al. |
| 2005/0233183 | A1* | 10/2005 | Hampden-Smith ...... B01J 21/18 429/492 |
| 2005/0238948 | A1 | 10/2005 | Mei et al. |
| 2008/0160391 | A1 | 7/2008 | Joo et al. |
| 2008/0206616 | A1* | 8/2008 | Atanassova ......... H01M 4/8605 429/479 |
| 2008/0318099 | A1 | 12/2008 | Oh et al. |
| 2009/0017356 | A1 | 1/2009 | Hojo et al. |
| 2009/0208751 | A1 | 8/2009 | Green et al. |
| 2010/0167106 | A1 | 7/2010 | Pak et al. |
| 2011/0229777 | A1* | 9/2011 | Mak .................... H01M 4/8605 429/405 |
| 2012/0258854 | A1 | 10/2012 | Kawamura et al. |
| 2012/0300364 | A1 | 11/2012 | Cal et al. |
| 2014/0141354 | A1* | 5/2014 | Park .................... H01M 4/8663 429/482 |
| 2015/0017555 | A1* | 1/2015 | Schuth ................ H01M 4/8605 429/405 |
| 2015/0050583 | A1 | 2/2015 | Schueth et al. |

FOREIGN PATENT DOCUMENTS

| | | | | |
|---|---|---|---|---|
| CN | 101491777 | A | 7/2009 | |
| CN | 102007186 | A | 4/2011 | |
| CN | 102017248 | A | 4/2011 | |
| CN | 102197523 | A | 9/2011 | |
| CN | 102800486 | A | 11/2012 | |
| DE | 10159476 | A1 | 7/2003 | |
| DE | 102004011335 | A1 | 9/2005 | |
| DE | 102007057488 | A1 | 12/2008 | |
| DE | 102007031280 | A1 * | 1/2009 | .......... H01M 4/8605 |
| DE | 102009056034 | A1 | 12/2010 | |
| DE | 112009005452 | T5 | 11/2012 | |
| DE | 102012102120 | | 8/2013 | |
| JP | 2013115016 | | 6/2013 | |
| JP | 2014502248 | | 1/2014 | |
| KR | 20100116623 | | 11/2010 | |
| KR | 20130071624 | | 7/2013 | |
| KR | 20150068193 | A * | 6/2015 | |
| MY | 141786 | A | 6/2010 | |
| WO | WO9720358 | | 6/1997 | |
| WO | WO2007115898 | A1 | 10/2007 | |
| WO | WO2013/117725 | | 8/2013 | |

OTHER PUBLICATIONS

English machine translation of Huebner et al. (DE 102007031280 A1) (Year: 2009).*

English machine translation of Hong et al. (KR 20150068193 A) (Year: 2015).*

Zhang Lei et al: "Effect of template size on the synthesis of mesoporous carbon /spheres and their supported Fe-based ORR electrocatalysts", Electrochjmica Acta, Bd. 108, Jul. 17, 2013 (Jul. 17, 2013), pp. 814-819.

\* cited by examiner

CATALYST LAYER FOR A FUEL CELL AND METHOD FOR THE PRODUCTION THEREOF

The present invention relates to a catalyst layer for a fuel cell, including a catalyst material containing a catalytic material and, optionally, a porous carrier material, on which the catalyst material is supported, as well as a method for manufacturing the catalyst layer.

BACKGROUND

Fuel cells utilize the chemical reaction of a fuel with oxygen yielding water, in order to generate electrical energy. For this purpose, fuels cells contain as a core component the so-called membrane electrode unit (MEA for membrane electrode assembly), which is a combination of a proton-conducting membrane and one electrode each (anode and cathode) situated on either side on the membrane. In addition, gas diffusion layers (GDL) may also be situated on either side of the membrane electrode assembly on the sides of the electrodes facing away from the membrane. The fuel cell is generally formed by a plurality of MEAs arranged in a stack, whose electric power outputs are added up. During operation of the fuel cell, the fuel, in particular, hydrogen $H_2$ or a gas mixture containing hydrogen, is supplied to the anode, where an electrochemical oxidation of $H_2$ to $H^+$ takes place giving off electrons. A (water-bound or anhydrous) transport of protons $H^+$ from the anode space into the cathode space takes place across the electrolyte or the membrane, which separates and electrically isolates the reaction chambers from one another in a gas-tight manner. The electrons provided at the anode are conducted to the cathode via an electrical line. Oxygen or an oxygen-containing gas mixture is supplied to the cathode, so that a reduction of $O_2$ to $O^{2-}$ takes place taking up electrons. At the same time, these oxygen anions react in the cathode space with the protons transported across the membrane while forming water. As a result of the direct conversion from chemical into electrical energy, fuel cells, by circumventing the Carnot factor, achieve an improved degree of efficiency compared to other electricity generators.

The presently most advanced fuel cell technology is based on polymer electrolyte membranes (PEM), in which the membrane itself is made of a polymer electrolyte. Acid-modified polymers, in particular, perfluorinated polymers are often used for this purpose. The most widely common representative of this class of polymer electrolytes is a membrane made of a sulfonated polytetrafluorethylene copolymer (trade name: Nafion; copolymer made of tetrafluorethylene and a sulfonic acid fluoride derivative of a perfluoralkyl vinyl ether). The electrolytic conduction takes place via hydrated protons, which is why the presence of water is prerequisite for the proton conductivity and a moistening of the operating gases is required during operation of the PEM fuel cell. Due to the need for water, the maximum operating temperature of these fuel cells at normal pressure is limited to below 100° C. In contrast to high temperature polymer electrolyte membrane fuel cells (HT-PEM fuel cells), the electrolytic conductivity of which is based on an electrolyte bound by electrostatic complex bonding to a polymer backbone of the polymer electrolyte membrane (for example phosphoric acid-doped polybenzimidazole (PBI) membrane) and which are operated at temperatures of 160° C., this fuel cell type is also referred to as a low temperature polymer electrolyte membrane fuel cell (NT-PEM fuel cell).

The catalyst layer of fuel cells is used for oxidizing hydrogen at the anode and for reducing oxygen at the cathode. The gas diffusion layers are generally constructed of carbon fiber paper, carbon and/or a carbon non-woven and exhibit a high porosity, which enable good access of the reaction gases to the catalyst layers and a good discharge of the reaction products and the cell current. In order to achieve a preferably solid bond between the polymer electrolyte membrane and the catalyst layers applied to either side, respectively, with the anode and the cathode having preferably solid contact with the membrane, the catalyst layers are in general each applied to the membrane in the form of a catalyst ink. It is equally possible to apply such a catalyst ink to a gas diffusion layer and, in turn, to press this together with the corresponding membrane. A catalyst ink generally contains an electrocatalyst, an electron conductor, and, if necessary, a polymer electrolyte as well as a solvent (WO 2007/115898 A1).

The electrodes are made of a catalyst layer. The catalyst is typically a precious metal, such as platinum or another metal of the platinum group in elementary form, as alloys or as a compound, for example, platinum oxide. The catalyst is usually situated on a carbon carrier in the form of fibers and/or granules (US 2005/0238948A1). Due to electrochemical oxidation and reduction processes, a degradation of the catalyst material as well as the carrier material may result, which mutually reinforce one another, in particular, in the presence of product water. Thus, the reduction of a platinum oxide layer with a change in cathodic potential caused by the reaction of the desorbing oxygen species with the carbon results in increased corrosion of the catalyst carrier. The catalyst carrier exists in porous form, in order on the one hand to provide a large active surface and, on the other hand, to ensure a transport of media. Thus, in addition to a power degradation of the fuel cell, corrosion of the catalyst carrier results in a decrease in porosity and increasingly in an accumulation of product water in the electrode area which, in turn, promotes corrosion.

In order to counteract carbon corrosion, a device is known from DE 102007057488 A1, which includes a complex, active ventilation system for preventing the formation of a hydrogen/oxygen boundary surface at the anode of the fuel cell and, therefore, one of the causes of carbon corrosion in fuel cells.

In addition, a strategy is known from DE 102009056034 A1 for avoiding carbon corrosion. To avoid damage to the fuel cell system, the fuel cell system may be switched off using a hydrogen-hydrogen switch-off strategy, in which hydrogen is present at both electrodes (anode and cathode) after the switch-off operation is ended. This is based on the consideration that no harmful carbon corrosion will take place if the fuel system is re-started before air flows into the cathode.

SUMMARY OF THE INVENTION

However, these methods are very complex and not applicable to conventionally designed fuel cells.

It is an object of the present invention to provide a catalyst layer of an electrode for a broad spectrum of fuel cells, which ensures improved water management and, therefore more stable performance parameters. The transport of water, in particular, is intended to be maintained even in the case of degradation phenomena in the electrode area, and, therefore, to increase the long-term stability of the electrode.

A first aspect of the present invention relates to a catalyst layer, which includes a catalyst material containing a catalytic material and, optionally, a porous carrier material on which the catalytic material is supported. The catalyst layer is distinguished by the fact that it also includes carbon-based mesoporous particles.

The carbon-based mesoporous particles increase the overall porosity of the catalyst layer and benefit the removal of media. The particular nature of the particles promotes a transport, in particular, a discharge of product water. The hydrophobic character of the particles advantageously prevents the particles in the catalyst layer according to the present invention from retaining water. Thus, it is possible to prevent, or at least reduce, an accumulation of water in the catalyst layer. This may advantageously reduce or delay a catalyst reduction and/or corrosion of carbon, which is used, in particular, as a carrier material for the catalyst. The accompanying stabilization of the catalyst layer is advantageously associated with an increase in the service life of an associated fuel cell. In addition, it has been found that an accumulation of water alone in the active area of a fuel cell caused a voltage drop during operation of the fuel cell. Thus, the prevention or reduction of accumulations of water in the catalyst layer not only contributes to an increase in the service life of a fuel cell, but it also has a positive effect on the performance parameters at the start of a life cycle of the fuel cell.

The catalyst material present in the catalyst layer is a fine particulate, i.e., preferably powdery dispersed or suspended solids made of catalytically active material. These are well known to those skilled in the art. Suitable catalytically active materials are generally selected from the group made up of platinum, palladium, iridium, rhodium, ruthenium and mixtures thereof. Platinum and/or ruthenium are particularly preferred. In one particular preferred specific embodiment, platinum alone or a mixture of platinum and ruthenium is used. Known polyoxy metals may also be used. The catalytically active metals or mixtures thereof preferably used may, if necessary, contain additional alloying additions such as, for example, cobalt, chromium, tungsten, molybdenum, vanadium, iron, copper, nickel, silver, gold, iridium and tin. Which of the cited catalytically active metals is used, basically depends on the planned field of application of the finished fuel cell. If, for example, a fuel cell is manufactured which is operated with hydrogen as the fuel, then platinum is preferably used as the catalytically active material.

The catalyst layer according to the present invention may be used for both the anode and the cathode in a fuel cell.

The catalytically active material may be present elementally as well as chemically bonded, in particular, in oxides. In addition, the catalytically active material may be supported on a suitable carrier material. Suitable carrier materials are known to those skilled in the art, for example, carbon-based electron conductors selected from the group made up of carbon black, graphite, carbon fibers, carbon nanoparticles, carbon foams, carbon nanotubes or mixtures thereof. If the catalytic material is supported, this is understood in the present case to mean physical bonds between the catalytic material and the carrier, in particular, an adsorption of the catalytic material on the carrier. The catalytic material is usually present elementally on the surface of the carrier and is fixed to the surface by physical interactions between the catalytic material and the carrier.

Also present in the catalyst layer according to the present invention, in addition to the catalyst material, are mesoporous particles. In the present invention "mesoporous particles," following the IUPAC definition, are understood to mean a solid material, which has pores having an average diameter between 2 nm and 50 nm. Based on a Gaussian distribution of the pore diameters, the pore diameter of 2 nm to 50 nm relates to an average pore diameter within the Gaussian distribution. Materials having an average pore diameter smaller than 2 nm, on the other hand, are referred to as microporous, those having an average pore diameter of 50 nm are macroporous. The mesoporous particles preferably have an average pore diameter in the range of 2 nm to 20 nm. It has been found that an average pore diameter of 20 nm is sufficient, in particular, to dissipate water vapor through the pores out of the layer and, at the same time, is small enough to preferably prevent an accumulation of liquid water within the pores, for example, through capillary forces. The latter may be the case, for example, with nanotubes or macroporous particles. By contrast, liquid water does not penetrate into pores having the preferred diameters or penetrates in only negligible amounts into the pores.

According to the present invention, the mesoporous particles in the catalyst layer include carbon or are made of carbon. This is understood to mean, in particular, graphitic or amorphous carbon in the form of graphite or carbon black. These are hydrophobic materials. The hydrophobic character may be determined, for example, with the aid of a contact angle measurement between a drop of water and a planar surface of the material. Materials suitable for the present invention show a static contact angle of preferably greater than 80°, preferably greater than 90°, in particular, greater than 100°. The hydrophobic character enhances the dissipative effect of product water, as does the mesoporous structure. At the same time, a tendency for water vapor to condense on the surface of the mesoporous particles may be reduced as a result, since no, or at least barely any, condensation nuclei form, which may adhere to the surface. Substituents, which are adsorbed or bonded on the surface of the particles, could counteract this effect, in particular, if they are polarizing or have hydrophilic properties. Catalytic material, for example, may have such an effect.

Thus, it is provided in a particularly preferred embodiment of the present invention that the particles are not carriers for the catalyst material. There is preferably no catalytic material adsorbed and/or chemically bonded to the surface of the mesoporous particles. This ensures that the mesoporous particles are electrochemically decoupled from the catalytically active material. Thus, an altered potential at the cathode is advantageously prevented from promoting corrosion of the particles. Rather, the hydrophobic character and the porosity of the particles are maintained.

It is further preferred that the mesoporous particles have a specific pore volume of at least 2 ml/g. On the one hand, this offers the advantage that an accumulation of water does not take place within the particles due to adhesion and cohesion effects. On the other hand, the pore volume defines the total number of pores per particle or per catalyst layer as a function of the pore diameter. Since the pore diameter is already limited to 2 nm to 50 nm given the limitation to mesoporous particles, particles having a preferably large pore volume of at least 2 ml/g, preferably at least 5 ml/g, in particular, at least 10 ml/g include a particularly high number of pores. A high number of pores, in turn, is accompanied by multiple diffusion paths. In comparison to nanotubes, which are frequently used as carrier material for catalytically active material, this offers the advantage that a media transport, in particular, a water transport is also ensured if individual pores are plugged or inactivated in some other way. The pore volume may be determined with the aid of water saturation as follows: if the material is completely saturated with water (pore volume=water volume) and the water is removed from it in stages with known negative pressures, then the wide (fast draining) and the narrow (slow draining) macropores, the mesopores and the micropores can be drained in succession. A total or average pore volume is then attainable from the difference in volumes.

It is also preferred that the particles on average do not exceed a size of 2 μm, preferably of 1 μm, in particular of 0.75 μm. The advantage in this configuration is in a preferably minimal layer thickness of the catalyst layer. One requirement of the catalyst layer, in particular, when used in fuel cells, is that it is as thin as possible with a preferably large but homogenous surface. The thickness, in particular, of a catalyst layer according to the present invention is determined by the diameter of the largest particles. In order to obtain catalyst layers which do not exceed the conventional thicknesses of a catalyst layer, it is preferred that the particles have, on average, a diameter which does not exceed the diameter of other solid components of the catalyst layer.

In another embodiment of the present invention, the catalyst layer also includes water-retaining mesoporous particles made of silicon dioxide and/or carbon. These may affect the water management in the catalyst layer insofar as a portion of the water is retained in the catalyst layer without resulting in an accumulation of water in the area of the catalyst material harmful to the performance of the fuel cell. These particles may discharge water if needed, in particular, in fuel cells in which the membrane requires that it be moistened in order to prevent it from drying out. This requirement is controlled in such cases by diffusion gradients.

Particularly preferably, 1 m$^2$ of a catalyst layer according to the present invention has, on average, 0.5 g to 5 g of particles. This range proved particularly suitable for increasing the dissipation of water and/or water vapor from the catalyst layer. An average proportion of the particles in the catalyst layer of 1 g of particles per m$^2$ of catalyst layer is particularly preferred. Such a proportion of particles in the catalyst layer ensures that, on the one hand, the layer thickness of the catalyst layer formed with a preferably high number of pores is not excessively increased (upper limit), at the same, however, the desired high porosity and the resultant media transport is ensured (lower limit).

Another aspect of the present invention relates to a method for manufacturing a catalyst layer for a fuel cell according to the present invention, including the following steps:
    providing a catalyst ink, including a catalyst material, which contains a catalytic material and, optionally, a porous carrier material, on which the catalytic material is supported, as well as carbon-based mesoporous particles, and
    applying the catalyst ink to a substrate, which is selected from a polymer electrolyte membrane and/or a gas diffusion layer.

If the loaded catalyst ink is applied to a suitable polymer electrolyte membrane, a catalyst coated membrane (CCM) is then obtained. The membrane in this case may be coated on one or on both sides. According to the present invention, it is also possible, however, to apply the catalyst ink to a gas diffusion layer, a gas diffusion electrode then being obtained. The assemblage of CCM and gas diffusion layers or of membrane and gas diffusion electrodes yields a membrane electrode assembly. Methods for joining the individual layers are sufficiently known to those skilled in the art, for example, pressing, hot pressing or gluing.

In principle, the catalyst ink is applied in a homogeneously dispersed form to a substrate, for example, an ion-conducting polymer electrolyte membrane or a gas diffusion layer, for manufacturing a membrane electrode assembly. Known tools such as, for example, high speed agitators, ultrasonic mills and/or ball mills may be used to manufacture a homogenously dispersed ink. The homogenized ink may then be applied to the substrate with the aid of various techniques such as, for example, printing, spraying, knife coating, rolling, brushing, painting, as well as screen printing or injection printing. In addition, the coated substrate may be annealed, for example, at a moderate temperature, i.e., at 25° C. to 100° C., after the catalyst ink according to the present invention has been applied.

To manufacture catalyst layer 20, the catalyst ink is initially provided. For this purpose, a conventional catalyst ink mixed with mesoporous particles may be used.

A conventional catalyst ink contains, for example, 25% to 95% water, 1% to 50% supported catalyst (catalytic material and carrier material), optionally 1% to 50% of a polymer electrolyte (for example an ionomer) and 1% to 50% of a pore builder (for example, a polar aprotic organic solvent).

The polar aprotic organic solvent generally has a standard boiling point of at least 80° C., in particular, at least 100° C., in particular, at least 160° C. and more preferably at least 200° C. Suitable polar aprotic organic solvents include: dimethyl sulfoxide (DMSO), N,N-dimethyl acetamide (DMA), ethylene carbonate, propylene carbonate, dimethyl carbonate, diethyl carbonate, N,N-dimethylformamide (DMF), N-methylpyrrolidinone (NMP), dimethyl imidazolidinone, acetonitrile, butyrolactone, hexamethyl phosphoric triamide, isobutyl methyl ketone and sulfolane.

The ink may be mixed in accordance with any suitable method, whereby the ingredients may be admixed in arbitrary sequence. The ink is generally produced by agitating while heating, and may be subsequently diluted to a coatable consistency. The ink generally has a viscosity of 10 Pa·s at 1 s$^{-1}$, in particular, 6 Pa·s or less, in particular, 2 Pa·s or less and more preferably 1-Pa·s or less. Carbon-based mesoporous particles having the features described above are then introduced into the catalyst ink and re-agitated. The particles may also be added to it during the manufacturing process of the catalyst ink. It is particularly preferred that the carbon-based mesoporous particles are added to the ink prior to its application on a substrate, independently of the manufacture of conventional catalyst ink.

The ink may be applied to the substrate with any suitable method, including both manual methods as well as machine methods, for example, brushing on by hand, coating with the notched bar, coating with a fluid-bearing nozzle, coating with a wirewound rod, coating with the aid of a doctor knife with a slot feed, coating with three rollers or peel-off transfer. In the case of peel-off transfer, the ink is first applied to a transfer substrate and dried and subsequently transferred as a transfer picture to the substrate. The coating may be accomplished in one application or in multiple work steps. After coating, the ink may be dried in an oven or the like in air at temperatures of greater than 80° C., typically greater than 110° C. and preferably greater than 140° C. The ink according to the present invention preferably does not self-ignite when it is fully dried under these conditions. An ink that does not self-ignite during drying is also generally safer to produce, handle and to apply.

The various specific embodiments of the present invention cited in this application are, unless otherwise implemented in individual cases, advantageously combinable with one another.

The present invention is explained in greater detail below in exemplary embodiments with reference to the associated drawings.

DETAILED DESCRIPTION

Figure 1:
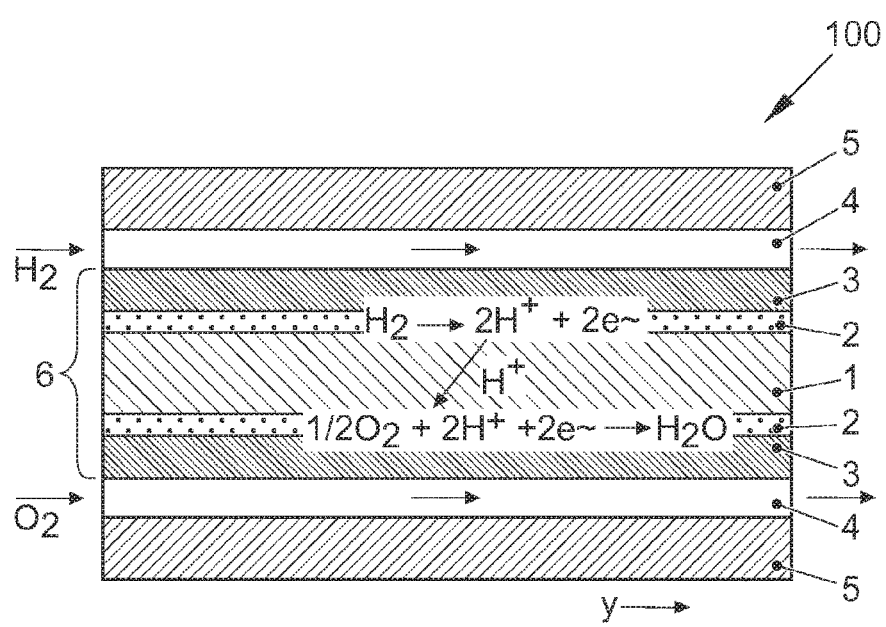
FIG. 1 schematically shows a sectional view of a PEM fuel cell (individual cell), FIG. 2 schematically shows a sectional representation of a catalytically coated substrate having a catalyst layer according to the present invention.

A schematic sectional view of an individual cell of a PEM fuel cell, identified in its entirety with reference numeral 100, is depicted in FIG. 1 for explaining the structure and its mode of operation.

Fuel cell 100 includes as its core component a membrane electrode assembly 6, which has a polymer electrolyte membrane 1 as well as one electrode 2 each, namely, an anode and a cathode, attached on one or both flat sides of membrane 1. Polymer electrolyte membrane 1 is a cation-, in particular, proton ($H^+$)-conducting membrane. Electrodes 2 include a catalytic material, which may be supported on an electrically conductive material, for example, a carbon-based material.

A gas diffusion layer 3 is attached to each electrode 2, which is essentially assigned the task of uniformly distributing the supplied process gases over the main surfaces of electrodes 2, and membrane 1.

A bipolar plate 5 is situated on the outside of each gas diffusion layer 3. Bipolar plates have the task of interconnecting individual membrane electrode assemblies 6 of the individual cells in the stack electrically to one another, to cool the fuel cell stack and to supply the process gases to electrodes 2. For this latter purpose, bipolar plates 5 (also called flow field plates) include flow fields 4. Flow fields 4 include, for example, a plurality of flow channels situated in parallel to one another, which are incorporated in the form of furrows or grooves in plates 5. Each bipolar plate normally includes an anode flow field on its one side, which faces anode 2, and a cathode flow field on its other side facing the cathode. In the present case, only one flow field 4, respectively, is depicted for each of the two depicted bipolar plates 5. A fuel, in particular, hydrogen ($H_2$) is supplied to the anode flow field, whereas an oxygen ($O_2$)-containing operating medium, in particular, air, is supplied to the cathode flow field.

The reactions taking place at the anode and the cathode are also depicted in FIG. 1. Accordingly, a catalytic oxidation of hydrogen $H_2$ to protons $H^+$ takes place at the anode giving off electrons. The protons migrate through proton-conducting membrane 1 to reach the cathode. There, the supplied oxygen $O_2$ reacts with the protons yielding water $H_2O$, the oxygen being reduced and therefore taking up electrons. The electrons of the anode reaction are supplied to the cathode via an outer electrical circuit not depicted. It is apparent from FIG. 1 that the product water of fuel cell 100 accrues on the cathode side of membrane 1.

Figure 2:
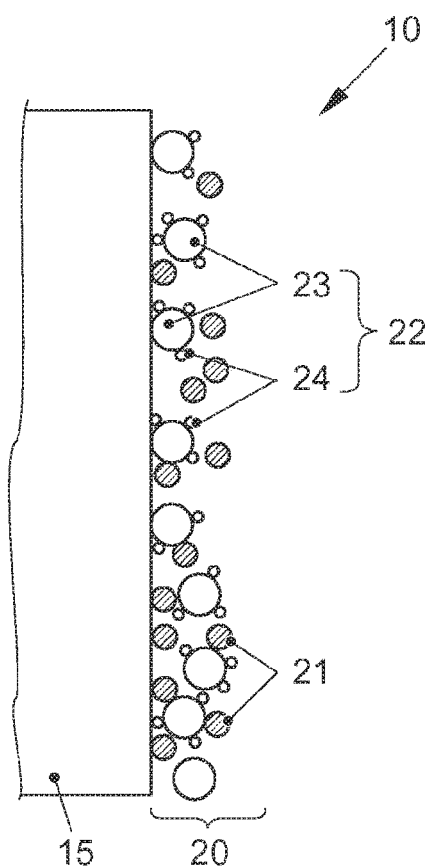

FIG. 2 shows a detail of a catalytically coated substrate 10 according to the present invention in a schematic sectional representation. Catalytically coated substrate 10 includes a substrate 15 to which a catalyst layer 20 according to the present invention is applied. Catalyst layer 20 may function as a cathode or an anode in a fuel cell. Substrate 15 may be a membrane or a gas diffusion layer. In the specific embodiment depicted herein, substrate 15 is a membrane. Membrane 15 may, in principle, be an arbitrary membrane used in fuel cell technology. These include, for example, polymer electrolyte membranes, the electrolytic conductivity of which is based on its moistening with water (for example, Nafion®), or those which owe their conductivity to an acid bonded to the polymer material, for example, polybenzimidazole doped with phosphoric acid.

Catalyst layer 20 is composed of at least one catalyst material 22 and particles 21. It may also include a solvent, an electrolyte and/or an electron conductor. Catalyst material 22 in the specific embodiment depicted, in turn, includes a catalytic material 24, which is adsorbed on a carrier material 23.

Carrier material 23 functions as an electron conductor. The electron conductor is generally an electrically conductive carbon particle. All carbon materials known in the field of fuel cells or electrolyte cells having high electrical conductivity and a large surface may be used as electrically conductive carbon particles. The surface is, for example, 50 $m^2/g$ to 200 $m^2/g$. Carbon black, graphite or active carbons are preferably used. Carbon blacks having high conductivity, so-called conductive carbon blacks are particularly preferably used. In addition, carbon may also be used in other modifications, for example, in granular form or as so-called nanotubes.

All materials which promote the chemical processes at the location of catalytically coated substrate 10 may be used as catalytically active material 24. If catalytically coated substrate 10 is used in a fuel cell, the elements, in particular, of the group IIIb, IVb, Vb, VIb, VIIb, VIIIb, Ib, IIb of the Periodic Table of the Elements as well as tin are preferred. The metals of the platinum group, preferably platinum, palladium, iridium, rhodium, ruthenium and/or mixtures thereof are particularly preferred. In addition, alloys of, for example, platinum, cobalt, nickel, iron and/or iridium may also be used as a catalyst. Generally, catalytically active material 24 is present in the oxidation stage ±0. Oxides of catalytic material 24 are also possible, however.

If catalytic material 24 is present on a carrier 23, it may be a chemical bond, preferably however, a physical adsorption of catalytic material 24 on the surface of carrier 23. For this purpose, carrier 23 may be impregnated with catalytic material 24, carrier material 23 being introduced into a salt solution of catalytic material 24 such as, for example, platinum chloride or platinum nitrate, the catalytic metal cation being sorbed on the surface of material 24 and subsequently reduced to metal. As a result of the impregnation, catalytic material 24 is adsorbed on the surface of carrier material 23.

According to the present invention, particles 21 are mesoporous particles 21 made of a hydrophobic material, which are not related to catalytic material 24 in the embodiment depicted. Hydrophobic materials in this case are, in particular, hydrophobic carbons and compounds thereof. The particles are present in catalyst layer 20 in a concentration in the range of 0.5 g to 5 g particles per $m^2$ of catalyst layer. The particles have on average a size of 1 μm maximum. The highly porous particles 21 show a pore diameter in the range of 2 nm to 50 nm. They have, on average, a pore diameter in the range of 2 nm to 50 nm. A pore diameter of, on average, 20 nm maximum is particularly preferred. A pore volume of at least 2 ml/g is formed depending on the number of pores.

The pores of particles 21 in this case show, in particular, the function of the media transport. Water, in particular, is intended to be removed from catalyst layer 20 in order to prevent a decrease in the performance output or in the service life of a catalytically coated substrate 10. The hydrophobic character of particles 21 supports this function, since it prevents water from accumulating in the interior of the pores.

LIST OF REFERENCE NUMERALS

100 fuel cell
1 membrane
2 electrode
3 gas diffusion layer—GDL
4 flow field
5 bipolar plate—BPP
6 membrane electrode assembly—MEA
10 catalytically coated substrate
15 substrate/polymer electrolyte membrane
20 catalyst layer
21 particles
22 catalyst material
23 carrier material
24 catalytically active material

The invention claimed is:

1. A catalyst layer for a cathode of a fuel cell, the catalyst layer comprising:
   a catalyst material containing a catalytic material; and
   hydrophobic carbon-based mesoporous particles, the catalyst material and the hydrophobic carbon-based mesoporous particles being on a cathode side of a polymer electrolyte membrane, the hydrophobic carbon-based mesoporous particles being in the form of a hydrophobic material.

2. The catalyst layer as recited in claim 1, wherein the catalytic material is not supported on the hydrophobic carbon-based mesoporous particles.

3. The catalyst layer as recited in claim 1, wherein the hydrophobic carbon-based mesoporous particles have an average pore diameter in the range of 2 nm to 20 nm.

4. The catalyst layer as recited in claim 1, wherein the hydrophobic carbon-based mesoporous particles have a pore volume of at least 2 ml/g.

5. The catalyst layer as recited in claim 1, wherein the hydrophobic carbon-based mesoporous particles have an average size of no more than 1 µm.

6. The catalyst layer as recited in claim 1, further comprising water-retaining particles made of silicon dioxide or carbon.

7. The catalyst layer as recited in claim 1, wherein the catalyst layer has an average content of the hydrophobic carbon-based mesoporous particles of 0.5 g to 5 g per square meter ($g/m^2$).

8. The catalyst layer as recited in claim 1, further comprising a porous carrier material, the catalytic material being supported on the porous carrier material.

9. The catalyst layer as recited in claim 1 wherein the hydrophobic material is graphite.

10. The catalyst layer as recited in claim 1 wherein the hydrophobic material is carbon black.

11. The catalyst layer as recited in claim 1 further comprising water retaining mesoporous particles.

12. The catalyst layer as recited in claim 11 wherein the water retaining mesoporous particles are made of silicon dioxide or carbon.

13. The catalyst layer as recited in claim 1 wherein the hydrophobic carbon-based mesoporous particles have a hydrophobicity showing a static contact angle of greater than 80 degrees.

14. The catalyst layer as recited in claim 13 wherein the hydrophobic carbon-based mesoporous particles have a hydrophobicity showing a static contact angle of greater than 90 degrees.

15. The catalyst layer as recited in claim 14 wherein the hydrophobic carbon-based mesoporous particles have a hydrophobicity showing a static contact angle of greater than 100 degrees.

16. The catalyst layer as recited in claim 1 wherein the catalyst layer is directly coated on the cathode side of the polymer electrolyte membrane.

17. A cathode of a fuel cell comprising the catalyst layer as recited in claim 1.

18. A fuel cell comprising a polymer electrode membrane having a catalyst layer, the catalyst layer comprising:
   a polymer electrode membrane;
   a catalyst material containing a catalytic material; and
   hydrophobic carbon-based mesoporous particles, the catalyst material and the hydrophobic carbon-based mesoporous particles being on a cathode side of the polymer electrolyte membrane, the hydrophobic carbon-based mesoporous particles being in the form of a hydrophobic material.

\* \* \* \* \*